(No Model.)
C. BIRKERY.
CULINARY UTENSIL.
No. 410,632.  Patented Sept. 10, 1889.
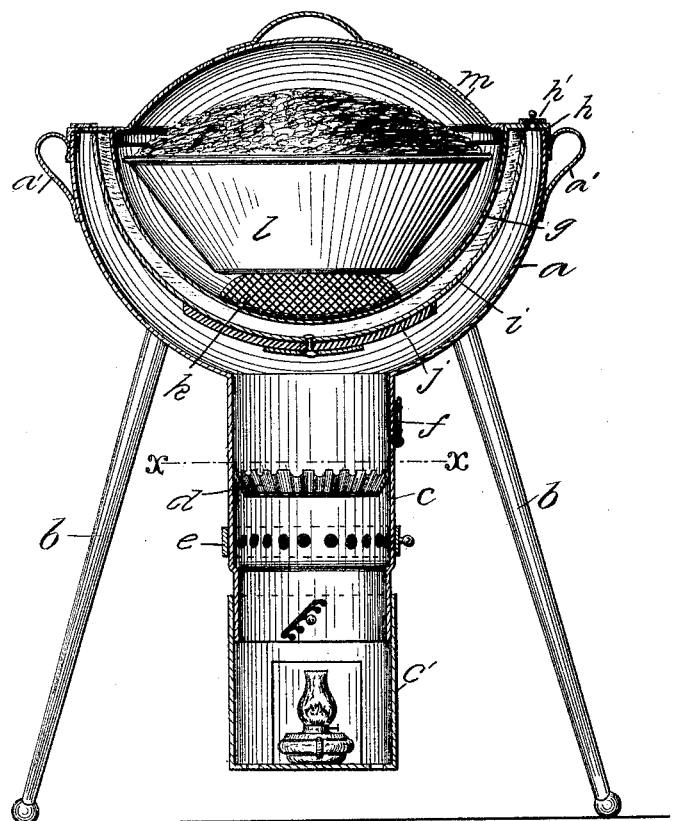
Fig. 1
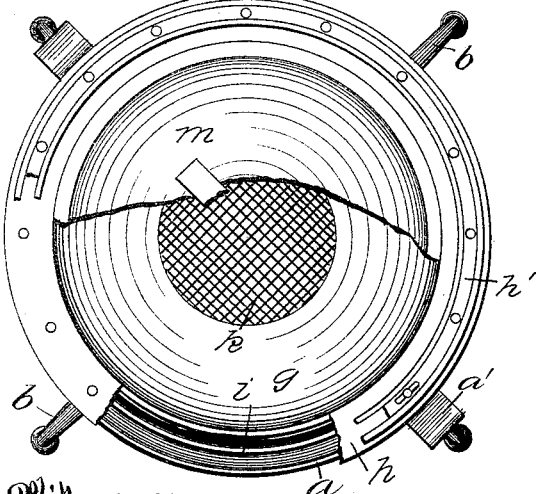
Fig. 2
Fig. 3
Witnesses:
A. B. Jenkins.
A. S. Williams.
Inventor,
Cornelius Birkery, by
Harry R. Williams.
Attorney.

UNITED STATES PATENT OFFICE.

CORNELIUS BIRKERY, OF HARTFORD, CONNECTICUT.

CULINARY UTENSIL.

SPECIFICATION forming part of Letters Patent No. 410,632, dated September 10, 1889.

Application filed October 2, 1888. Serial No. 286,946. (No model.)

*To all whom it may concern:*

Be it known that I, CORNELIUS BIRKERY, of Hartford, Connecticut, have invented certain new and useful Improvements in Culinary Utensils, of which the following is a specification.

My invention relates to the class of utensils used to aid in making bread and the like edibles made from dough, and the object is to provide a utensil which will insure the proper fermentation of the dough, so that the bread will be light.

To this end the invention consists in a certain device for imparting uniformly to the dough the desired amount of heat.

Referring to the accompanying drawings, Figure 1 is a view in central vertical section of the utensil. Fig. 2 is a plan view, part of the cover and top being broken away to show the interior. Fig. 3 is a view in horizontal section on broken line $x$ $x$ of Fig. 1.

The letter $a$ denotes a metallic vessel, preferably hemispherical in shape, which is supported by legs $b$ and provided with handles $a'$, by which it may be lifted. A sectional cylinder $c$ depends from the bottom of the vessel, the upper section being secured to and opening into the vessel, while the lower section $c'$ is vertically adjustable in relation to the upper, so that the flame of the lamp, which is supported by the bottom of the lower section, may be located at varying distances from the pan containing the dough to be fermented. Openings are made through the bottom of the section $c'$ to allow the entrance of air to support the flame of the lamp. A deflector $d$ is placed in the cylinder, so as to distribute the heat and cause it to pass up around the edges of the cylinder in a gentle current, instead of rushing up in a central column from the chimney of the lamp. This deflector preferably consists of a crown-shaped piece of corrugated metal, the outer edges of the corrugations fitting the walls of the cylinder, leaving but small openings around the edge for the passage of warm air. A damper $e$, to allow superfluous heat to escape, is placed on the cylinder below the deflector, openings in the slide being made to register with openings in the walls of the cylinder for the exit of hot air when there is too much heat.

$f$ indicates a thermometer, the bulb of which is exposed to the interior of the cylinder to determine the temperature, so that the dampers may be regulated to subject the dough to the proper degree of heat. The inner vessel $g$ is smaller than the vessel $a$, and its upper edge is turned out to form a flange $h$, which sets over the edge of the outer vessel to hold the two apart.

$i$ is a casing that is similar to the vessel $g$, and is secured at its upper edge to the flange $h$.

$j$ is a piece of heat non-conducting material, preferably asbestus, attached to the bottom of the casing $i$ over the mouth of the cylinder. Inside of the vessel $g$ a cushion $k$, preferably wire-gauze, is placed to support a pan $l$, in which dough is placed, and over this is placed a cover $m$, which has perforations to allow the escape of gas which may generate during the fermentation of the dough. The flange $h$ is provided with openings controlled by the slide $h'$, to allow heat to escape from the vessel, should it be warm.

In using the device dough properly mixed in a pan is placed in the inner vessel and the cover put on, the chamber between the inner vessel and the casing $i$ filled with water, and the lamp in the cylinder lighted. The heat from the flame of the lamp ascends, and, after passing the deflector between the openings formed by the corrugations, strikes the non-conducting piece $j$ and rises on all sides of the vessel, keeping the dough in the interior warm. The non-conducting piece above the mouth of the cylinder prevents the heat from passing directly through the bottom of the vessel and heating the dough on the bottom more than elsewhere, and the wire cushion holds the pan away from the bottom and sides of the vessel, so as to prevent the dough from baking on the bottom or sides, while the water-jacket prevents any sudden change of temperature, as a draft of wind, from cooling off and spoiling the dough. If the flame from the lamp gives too much heat, the movable section of the cylinder can be lowered, while if it is cold the lamp-wick may be turned up and the lower section raised, so that much heat may be imparted to the dough.

With my device as much or as little heat as desirable may be imparted to the vessel to keep the mixture warm; but the great advantage is, that with but little heat the temperature can be kept constant, which is the chief requirement, in order that dough shall properly ferment and produce light bread.

I claim as my invention—

1. In combination, a vessel $a$, a dependent cylinder secured thereto and constructed in sections $c\ c'$, the lower one of which is adapted to support a heat-generating device, and means for adjusting one section of said cylinder in relation to the other section, whereby the heat in the casing $a$ may be increased or decreased, substantially as set forth.

2. In combination, a vessel $a$, a dependent cylinder communicating with said vessel and adapted to support a heat-generating device, a vessel $g$, supported within said vessel $a$, a water-chamber supported between said vessels $a$ and $g$, and a non-conducting shield $j$, secured to said water-chamber upon its lower side and exposed directly to the heat from the dependent cylinder and in contact with the said water-chamber throughout its entire length and breadth, substantially as set forth.

3. In combination, a vessel $a$, provided with dependent cylinder for supporting a heat-generating device, a vessel $g$, supported within said vessel $a$, a water-chamber $i$, supported beneath said vessel $g$, a perforated cover $m$ for said vessel $g$, and dampers for said dependent cylinder and the vessel $a$, substantially as set forth.

CORNELIUS BIRKERY.

Witnesses:
HARRY R. WILLIAMS,
A. B. JENKINS.